United States Patent
Hanik et al.

(10) Patent No.: US 11,370,850 B2
(45) Date of Patent: Jun. 28, 2022

(54) POLYMERIZATION COMPOSITIONS AND METHODS FOR MAKING AND USING SAME

(71) Applicants: Peter P. Hanik, Houston, TX (US); Ronnie M. Hanes, Union Grove, AL (US); Robin D. Rogers, Tuscaloosa, AL (US); Parasu Veera Uppara, Navi Mumbai (IN); Gabriela Gurau, Tuscaloosa, AL (US)

(72) Inventors: Peter P. Hanik, Houston, TX (US); Ronnie M. Hanes, Union Grove, AL (US); Robin D. Rogers, Tuscaloosa, AL (US); Parasu Veera Uppara, Navi Mumbai (IN); Gabriela Gurau, Tuscaloosa, AL (US)

(73) Assignee: PRETIUM INNOVATION, LLC, Houston, TX (US)

( * ) Notice: Subject to any disclaimer, the term of this patent is extended or adjusted under 35 U.S.C. 154(b) by 314 days.

(21) Appl. No.: 16/408,157

(22) Filed: May 9, 2019

(65) Prior Publication Data
US 2020/0002443 A1   Jan. 2, 2020

Related U.S. Application Data

(60) Provisional application No. 62/670,745, filed on May 12, 2018.

(51) Int. Cl.
 *C08F 4/646* (2006.01)
(52) U.S. Cl.
 CPC .................................. *C08F 4/646* (2013.01)

(58) Field of Classification Search
 CPC ........................................................ C08F 4/646
 See application file for complete search history.

(56) References Cited

U.S. PATENT DOCUMENTS

| 5,840,808 A | 11/1998 | Sugimura et al. |
| 8,026,323 B2 * | 9/2011 | Datta .................... C08F 210/16 526/160 |
| 2015/0025204 A1 | 1/2015 | Lee et al. |
| 2017/0114167 A1 * | 4/2017 | Holtcamp ........... C08F 4/65927 |
| 2017/0348680 A1 | 12/2017 | Nucciarone et al. |
| 2018/0162970 A1 | 6/2018 | Ding et al. |

FOREIGN PATENT DOCUMENTS

| WO | 2012091684 A1 | 7/2012 | |
| WO | WO-2013133595 A1 * | 9/2013 | .......... C08F 4/65904 |

OTHER PUBLICATIONS

Aug. 25, 2020 Notice of Transmittal of International Search Report (ISR) and Written Opinion (WO), ISR, and WO.

* cited by examiner

*Primary Examiner* — Catherine S Branch
(74) *Attorney, Agent, or Firm* — Robert W. Strozier

(57) ABSTRACT

Ethylenically unsaturated polymerization catalyst compositions including an active catalytic metal component and an ionic compound component and methods for making and using same.

10 Claims, No Drawings

POLYMERIZATION COMPOSITIONS AND METHODS FOR MAKING AND USING SAME

RELATED APPLICATIONS

This application claims the benefit of and priority to U.S. Provisional Patent Application Ser. No. 62/670,745 filed May 12, 2018 (12 May 2018).

BACKGROUND OF THE DISCLOSURE

1. Field of the Disclosure

Embodiments of the present disclosure relate to catalyst compositions for the polymerization of ethylenically unsaturated monomers and methods for making and using same.

In particular, embodiments of the present disclosure relate to catalyst compositions for the polymerization of ethylenically unsaturated monomers, wherein the catalyst compositions include a metal-containing catalyst composition including one or more metal-containing compounds and one or more ionic compounds.

2. Description of the Related Art

In 1935, Perrin discovered that ethylene could be polymerized at very high pressure into a semi crystalline solid. This discovery at the ICI laboratories led to the commercialization of low-density polyethylene in 1938. Low density polyethylene is produced in supercritical ethylene at high pressure (600 bar-3500 bar) and high temperature (200° C.-350° C.). This free radical polymerization leads to a highly branched polyethylene.

In 1950, Hogan and Banks, at the Phillips Petroleum Company, discovered that highly crystalline polyethylene could be produced at moderate temperature (70° C.-100° C.) and pressure (30 bar-40 bar) with a catalyst containing chromium oxide on a silica support: the Phillips catalyst.

In 1953, Ziegler, at the University of Mülheim, discovered that highly crystalline polyethylene could be synthesized under very mild conditions, atmospheric pressure and temperatures between 50° C. and 100° C. Ziegler used a catalyst of titanium chloride and alkylaluminum compounds. The Ziegler catalysts can be used to co-polymerize ethylene with α-olefins producing polyethylene with densities varying from 0.960 kg/L-0.880 kg/L, so called high density polyethylene and linear low-density polyethylene. In the late 1950s, the first low-pressure catalytic solution process was commercialized at Hoechst, Frankfurt.

The components of the active species of a Ziegler-Natta catalyst system are derived from a $TiCl_4$ catalyst and an aluminum alkyl cocatalyst. These two components interact to form an active site from which polymerization proceeds. The formation of the active sites has a significant influence on the catalyst productivity. Time for the interaction of catalyst components is required in order to generate active sites. Heterogeneous Ziegler-Natta systems contain a large number of different active sites as a result of the distribution of active sites on the catalyst support. The oxidation state of the titanium at the active site is critically important because of its influence on catalyst activity. For ethylene polymerization both $Ti^{3+}$ and $Ti^{2+}$ are active; however $Ti^{2+}$ sites are less active than $Ti^{3+}$ sites. Reducing the oxidation state of titanium to $Ti^{2+}$ can lead to a decrease in catalyst activity of up to 80% or more. Increased $Ti^{2+}$ concentrations also result in higher comonomer incorporation into the lower molecular weight fractions of the polymer which negatively impacts physical properties and increased stickiness of the polymer during production.

Ziegler first discovered the ability of alkylaluminum compounds to form complexes with certain transition metals including titanium and vanadium (Ziegler patent DE973626). Union Carbide U.S. Pat. No. 4,302,566 disclosed alkylaluminum co-catalysts having a formula $Al(R'')_cX'_dH_e$, where X' is Cl or Br or I or OR''', R'' and R''' are the same or different and are $C_1$ to $C_{14}$ hydrocarbon radicals, d is 0-1.5, e is 0 or 1, and c+d+e=3.

The co-catalyst commonly used in commercial polymerizations today is $Al(C_2H_5)_3$ or TEAL. One function of the co-catalyst is to reduce the transition metal valence state, typically titanium, to activate it for the polymerization of olefins. The cocatalyst also serves to transfer an alkyl group to the coordinated olefin to begin chain growth according to the following formula:

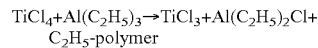
$C_2H_5$-polymer

Use of co-catalysts such as TEAL increase catalyst activity and enhance polymer morphology. However, TEAL reduces some portion of Ti to $Ti^{2+}$, which results in reduced catalyst activity. In addition for the production of copolymers such as ethylene-butene, ethylene-hexene, and ethylene-octene, the presence of $Ti^{2+}$ results in preferential incorporation of co-monomer into the lower molecular weight fractions of the copolymer negatively impacting polymer properties. In addition, higher co-monomer concentrations in the low molecular weight fractions results in the polymer being sticky during manufacture resulting in increased cost and downtime.

In addition to the above mentioned problems, TEAL and other aluminum alkyls are pyrophoric and rapidly combust when exposed to air or water. This presents a significant safety hazard in laboratory work and in production.

Thus, there is still a need in the art for new and novel polymerization catalytic systems and methods for polymerizing ethylenically unsaturated monomers.

SUMMARY OF THE DISCLOSURE

Embodiments of this disclosure provide polymerization catalyst compositions including a metal-containing catalyst composition including one or more metal-containing compounds and an ionic compound (IC). In certain embodiments, the polymerization catalyst compositions include one or more metal-containing compounds comprising active catalytic agents and one or more ionic compounds comprising co-catalytic agents, wherein the polymerization catalyst compositions have reduced pyrophoric components.

Embodiments of this disclosure provide methods of preparing IC compositions including combining one or more cations and one or more anions together to form the IC compositions.

Embodiments of this disclosure provide methods of polymerizing ethylenically unsaturated monomers including contacting a polymerization catalyst composition of this disclosure and one or more ethylenically unsaturated monomers. In certain embodiments, the ethylenically unsaturated monomers comprise linear, branched, and/or cyclic ethylenically unsaturated monomers, or mixtures thereof.

In certain embodiments, the polymerization catalyst compositions of this disclosure are designed to reduce or minimize an amount of active catalytic agents in the catalyst compositions by maximizing an amount of a particular (active) valence state of the active catalytic agents, while minimizing other valence states. In other embodiments, the active catalytic agents include compounds of titanium (Ti), zirconium (Zr), and hafnium (Hf) and the compositions are designed to maximize an amount of $Ti^{3+}$, $Zr^{3+}$, and/or $Hf^{3+}$ in the composition before and during polymerization, while minimizing an amount of $Ti^{4+}$, $Ti^{2+}$, $Zr^{4+}$, $Zr^{2+}$, and/or $Hf^{4+}$, and $Hf^{2+}$ in the composition. For example, in the case of titanium based catalytic agents, the polymerization catalyst compositions of this disclosure are designed to maximize $Ti^{3+}$, while minimizing further reduction to $Ti^{2+}$. The compositions of this disclosure are also designed to facilitate and improve active catalytic center formation and to improve transfer of ethylenically unsaturated monomers to the active catalytic centers.

In other embodiments, the polymerization catalyst compositions of this disclosure increase polymer yields (kg of polymer per g of active catalytic agents) compared to polymer yields in the absence of the IC compositions. In other embodiments, the polymerization catalyst compositions of this disclosure improve co-monomer incorporation into growing polymer chains, regardless of a molecular weight of the polymer. That is, the polymerization catalyst compositions of this disclosure improve incorporating one or more ethylenically unsaturated monomers into each growing polymer chain regardless of a length (number average molecular weight) of each chain. Thus, the resulting multi-monomer polymers have a more uniform distribution of monomers along the entire length of the polymers. For example, for an ethylene/n-butene polymer having 5% n-butene units and 95% ethylene (ethene) units, the resulting polymers would have the 5% n-butene units more uniformly distributed along the length of the polymer chains.

In other embodiments, the polymerization catalyst compositions of this disclosure improve laboratory safety and production facility safety by minimizing or eliminating pyrophoric components in the polymerization catalyst compositions. In other embodiments, the polymerization catalyst compositions of this disclosure improve the morphology of the polymer such that there are fewer fines in the resulting polymer or copolymer. In other embodiments, the polymerization catalyst compositions of this disclosure reduce a cost of the polymerization catalyst compositions compared to polymerization catalyst compositions in the absence of an IC composition of this disclosure. In other embodiments, the polymerization catalyst compositions of this disclosure improve the stereoregularity of polymers such as polypropylene.

DEFINITIONS USED IN THE DISCLOSURE

The terms "at least one", "one or more" or "one or a plurality" mean a single item/component/etc. or two or more items/components/etc. Additionally, these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "ionic compound" is used herein to refer to salt compositions comprising cations and anions to form a neutral salt composition. An ionic compound is not a solution of ions in a solvent or solutes dissolved in a solvent.

The term "metal halide anion" as used herein refers to a complex polyatomic anion, which contain at least a halogen bonded to a primary metal. These complexes may have a number of halogen atoms bonded to the primary metal in excess of the usual valence number of the metal. Alternatively, one or more of the halogen atoms may be replaced by oxygen or other atoms or alkyl groups. The term "primary metal" is used to refer to a metal that may form a complex anion with a halogen. A specific example is an anionic aluminum compound containing both a halogen and one or more alkyl groups.

The terms "MWD", "HMW", "LMW", "$M_n$", "$M_w$", "$M_r$", "$M_z$" and "$M_v$" means molecular weight distribution, high molecular weight, low molecular weight, number average molecular weight, weight average molecular weight, relative molecular mass, z-average molecular weight, and viscosity-average molecular weight, respectively.

The terms "X" or "DP", "s" or "$<s^2>^{1/2}$", "r" or "$<r^2>^{1/2}$", "$C_N$", "σ", "a", "g", and "$X_k$" means degree of polymerization, radius of gyration, end-to-end distance of vector, root-mean-square end-to-end distance, characteristic ratio, steric factor, persistence length, branching index, and average degree of polymerization, respectively.

The terms "UHMWPE", "ULMWPE" or "PE-Wax", "HMWPE", "LMWPE", "HDPE", "MDPE", "LDPE", "LLDPE", "VLDPE", "HDXLPE", "PEX" or "XLPE", CPE, mean ultra-high-molecular-weight polyethylene, ultra-low-molecular-weight polyethylene, high-molecular-weight polyethylene, high-density polyethylene, medium-density polyethylene, low-density polyethylene, linear low-density polyethylene, very low-density polyethylene, high-density cross-linked polyethylene, cross-linked polyethylene, and chlorinated polyethylene, respectively.

The term "tailoring the molecular weight distribution" means a MWD having a predetermined or desired value, e.g., an MWD that eliminates the molecular weight tail on the HMW component whilst not affecting the MWD of the LMW component.

The term "monomodal" means a polymer distribution having a single relative maximum.

The term "multimodal" means polymer distributions having at least two or more relative maxima or evidencing to normal (Gaussian distribution or Lorentzian distribution), e.g., a peak with a shoulder or other curve composed of more than one normal distribution or decomposable into more than on normal distribution, as determined analytically using instruments such as gel permeation chromatography. The term includes bimodal, a MWD having two relative maxima or evidencing two normal distributions and or polymodal, a MWD having more than two relative maxima or evidencing more than two normal distributions.

The terms "higher molecular weight component" and "lower molecular weight component" are used herein to indicate that one component of the polymer has a higher molecular weight than another component. The HMW component has a higher weight average molecular weight than the LMW component, i.e., the terms HMW and LMW are relative. The ratio of the weight average molecular weights of the HMW to LMW components is thus greater than 1. In certain embodiments, the ratio is greater than 1.1, greater than 1.5. In other embodiments, the ratio may be between 1.1 and 10, 1.1 and 5, or between 1.1 and 2. For example, there may be a difference in terms of Mw of at least 1000, e.g., at least 5000 or at least 10,000 mass units between higher molecular weight component and lower molecular weight component.

The HMW component may have a weight average molecular weight (WAMW) greater than about 100,000, or greater than about 150,000, or greater than about 175,000. For example, the HMW component may have a WAMW between about 100,000 and about 1,000,000, or between about 150,000 and about 250,000. The LMW component may have a WAMW between about 8000 and about 175,000, or between about 10,000 and about 150,000, or between about 20,000 and about 100,000.

The term "copolymer" as used herein is intended to encompass polymers comprising repeat units from two or more monomers. Generally, the copolymers disclosed herein are copolymers of ethylene and one or more additional ethylenically unsaturated monomers. The desired amount of co-monomer depends on the desired properties of the polymer. Typical amounts of co-monomers in a polymer produced in a two stage slurry-gas phase polymerization is about 1-10% by weight of the final polymer. However, higher co-monomer amounts, e.g. up to 20% by weight of final polymer are possible.

The term "homopolymer" as used herein is intended to encompass polymers composed substantially or essentially of repeat units deriving from a single monomer.

The term "Ziegler Natta (ZN) catalyst" is intended to cover any catalyst comprising a catalyst component formed from a transition metal compound of Group 4, Group 5, and/or Group 6 of the Periodic Table (IUPAC, Nomenclature of Inorganic Chemistry, 1989), a metal compound of Group 1, Group 2, and/or Group 3 of the Periodic Table (IUPAC) and optionally a compound of Group 13 and/or Group 14 of the Periodic Table (IUPAC). ZN catalysts may additionally comprise one or more cocatalysts and/or activators.

DETAILED DESCRIPTION OF THE DISCLOSURE

The inventors have found that new and novel polymerization catalyst compositions may be prepared, where the polymerization catalyst compositions include a metal-containing catalyst composition including one or more metal compounds and one or more ionic compounds, wherein the polymerization catalyst compositions have reduced pyrophoric components. The one or more active catalytic agents include one or more active polymerization metal-containing compounds such as compounds of titanium, zirconium, and/or hafnium or other metal used in the polymerization of ethylenically unsaturated monomers. The one or more ionic compounds are ionic compounds including an inorganic or organic cation and halogenated metal alkyl anion.

The inventors have found that the polymerization catalyst compositions of this disclosure may be used not only to polymerize ethylene into different polyethylenes, but also to polymerize ethylene and one or more non-ethylene ethylenically unsaturated monomers to produce copolymer, terpolymers, or higher order polymers. In certain embodiments, the non-ethylene ethylenically unsaturated monomers are α-olefins having between 3 and 10 carbon atoms ($C_3$-$C_{10}$ α-olefins). In other embodiments, the α-olefins include propylene, 1-butene, 1-hexene, 4-methylpent-1-ene, or mixtures thereof.

Ionic Compounds Used in the Co-Catalyst Component

Embodiments of this disclosure broadly relate to ionic compounds (ICs) including one or more salts of the general formula (I):

$$[Q]_a^+[A]_b^-  \qquad \text{I}$$

wherein:
Q is a cation,
A is an anion, and
a and b are selected such that each of the salts is electrically neutral.

In certain embodiments, Q includes an organic cation, an inorganic cation, or mixtures thereof and A includes organic anions, inorganic anions, or mixtures thereof.

In certain embodiments, the inorganic cations are selected from the group consisting of cations of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Cu^+$, $Cu^{2+}$, $Fe^+$, $Fe^{2+}$, $Fe^{3+}$, $Co^{2+}$, $Sn^{2+}$, $Pb^{2+}$, $Ni^{2+}$, $Zn^{2+}$, and mixtures thereof.

In certain embodiments, the organic cations are selected from the group consisting nitrogen-containing cations, phosphorus-containing cations, sulfur-containing cations, and mixtures or combinations thereof.

In certain embodiments, the ionic compounds include one or more compounds of the general formula (II):

$$[K_a]_i^{k+}[M_bX_cR_d]_j^{l-} \qquad \text{II}$$

wherein:
K comprises a nitrogen-containing organic cation, a phosphorus-containing organic cation, a sulfur-containing organic cation, or mixtures and combinations thereof,
$M_aX_bR_c$ is an anion,
M comprises one or more Group IIIA elements selected from the group consisting of the metalloid boron (B) and the metals aluminum (Al), gallium (Ga), indium (In), thallium (Tl), and mixtures or combinations thereof,
X comprises one or more halogen atoms selected from the group consisting of chlorine (Cl), fluorine (F), bromine (Br), iodine (I), and mixtures thereof,
R comprises a hydrocarbyl group containing from about 1 to about 20 carbon atoms,
a denotes the number of cations in the formula (II),
b denotes the number of metal elements in the formula (II),
c denotes the number of halogen atoms in formula (II), and
d denotes the number of hydrocarbyl groups in formula (II),
b+c+d have values that produce a stable anion,
k denotes the charge on the cation,
l denotes the charge on the anion,
i denotes the number of cations,
j denotes the number of anions, and
l, k, i, and j have values such that each of the ionic compounds is neutral.

In certain embodiments, the organic cations are organo-ammonium cations, organo-phosphonium cations, organic sulfonium cations, or mixtures and combinations thereof, and the hydrocarbyl groups are alkyl groups of the general formula $C_nH_{2n+1}$, wherein n is an integer having a value between about 1 and 20. In other embodiments, n is an integer having a value between 2 and 12, e.g., $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, and/or $C_{12}H_{25}$. In other embodiments, n is an integer having a value between about 1 and 4, i.e., $CH_3$, $C_2H_5$, $C_3H_7$, and/or $C_4H_9$.

In certain embodiments, the IC compounds are one or more compounds of the general formula (III):

$$[H_pER_q]^{+n}[M_rX_sR_t]^{-n} \qquad III$$

wherein:
H is hydrogen,
E is a nitrogen (N) atom, a phosphorus (P) atom, or a sulfur (S) atom,
M, X, and R are as described above,
n is a positive integer,
p is an integer having a value between 0 and 3,
q is an integer having a value between 1 and 4, provided that the sum of p and q is 4, p+q=4,
r is an integer having a value between 1 to 20
s is an integer having a value between 1 and 20
t is an integer having a value between 1 and 20, and
n, p, q, r, s, and t have values such that each of the IC compounds is neutral.

In certain embodiments, the compounds of the general formula (III) are selected from the group consisting of $[HNEt_3]^+[AlCl_4]^-$, $[HNEt_3]^+[Al_2Cl_7]^-$, $[HNEt_3]^+[AlEt_3Cl]^-$, $[HNEt_3]^+[Al_2Et_6Cl]^-$, $[HNEt_3]^+[Al_2Et_3Cl_4]^-$, $[HNEt_3]^+[Al_3Et_3Cl_7]^-$, $[HNEt_3]^+[GaCl_4]^-$, $[HNEt_3Cl]^+[AlCl_3+GaCl_3]^-$, $[HNEt_3]^+[0.67AlCl_3+0.33ZnCl_4]^-$, $[NEt_4]^+[AlCl_4]^-$, $[NEt_4]^+[Al_2Cl_7]^-$, $[NEt_4]^+[AlEt_3Cl]^-$, $[NEt_4]^+[Al_2Et_6Cl]^-$, $[NEt_4]^+[Al_2Et_3Cl_4]^-$, $[NEt4]^+[Al_3Et_3Cl_7]^-$, $[NEt_4]^+[Al_3Et_9Cl]^-$, $[NEt_4]^+[Al_4Et_{12}Cl]^-$, $[NEt_4]^+[Al_{10}Et_{30}Cl]^-$, $[HPEt_3]^+[AlCl_4]^-$, $[HPEt_3]^+[Al_2Cl_7]^-$, $[HPEt_3]^+[AlEt_3Cl]^-$, $[HPEt_3]^+[Al_2Et_6Cl]^-$, $[HPEt_3]^+[Al_2Et_3Cl_4]^-$, $[HPEt_3]^+[Al_3Et_3Cl_7]^-$, $[HPEt_3]^+[GaCl_4]^-$, $[HPEt_3Cl]^+[AlCl_3+GaCl_3]^-$, $[HPEt_3]^+[0.67AlCl_3+0.33ZnCl_4]^-$, $[PEt_4]^+[AlCl_4]^-$, $[PEt_4]^+[Al_2Cl_7]^-$, $[PEt_4]^+[AlEt_3Cl]^-$, $[NEt_4]^+[Al_2Et_6Cl]^-$, $[PEt_4]^+[Al_2Et_3Cl_4]^-$, $[PEt4]^+[Al_3Et_3Cl_7]^-$, $[PEt_4]^+[Al_3Et_9Cl]^-$, $[PEt_4]^+[Al_4Et_{12}Cl]^-$, $[PEt_4]^+[Al_{10}Et_{30}Cl]^-$, and mixtures or combinations thereof, wherein Et is $(C_2H_5)$.

Method of Preparing ICs

Embodiments of this disclosure broadly relate to methods of preparing IC compositions by reacting or contacting one or more cation precursor compounds and one or more anion precursor compounds under reaction condition sufficient to form one or more ionic compounds of Formulas (I), (II), or (III).

In certain embodiments, a molar ratio of cation precursors to anion precursors in the reaction may range from 1:10 to 10:1, from 1:5 to 5:1, from 4:1 to 1:4, form 3:1 to 1:3, from 2:1 to 1:2, and 1:1 or other ratios; provided, however, that each of the resulting ionic compounds is neutral. The ratios may be an integer, a rational number, or a real number; again provided, however, that the each of the resulting ionic compounds is neutral.

In certain embodiments, the cation precursors may be compounds of the general formula (IV):

$$[H_pER_q]^{+n}[Al']^{-n} \qquad IV$$

wherein:
H is hydrogen,
E, R, n, p and q are as described above, and
A' is a counter ion and may be any anionic species disclosed herein.

In certain embodiments, the compounds of the general formula (IV) are selected from the group consisting of $[NH_3R]^+X^-$, $[NH_2R_2]^+X^-$, $[NHR_3]^+X^-$, $[NR_4]^+X^-$, where R and X are as described above.

In certain embodiments, the anion precursors may be compounds of the general formula (V):

$$M_rX_{s'}R_{t'} \qquad V$$

wherein:
M, X, R, and r are as described above,
s' and t' are numbers having values so that the compound of Formula (V) is neutral.

In certain embodiments, the compounds of the general formula (V) are selected from the group consisting of $MR_3$, $MR_2X$, $MRX_2$, $MX_3$, wherein M, R, and X are as described above.

In certain embodiments, the cation precursor compounds comprise $NH_3EtX$, $NH_2Et_2X$, $NHEt_3X$, $NEt_4X$, or mixtures and combinations thereof, and the anion precursor compounds comprise $AlEt_3$, $AlEt_2Cl$, $AlEtCl_2$, or $AlCl_3$, wherein X is as previously described.

Catalyst

The catalyst of this disclosure for use in the catalyst compositions include a Ziegler-Natta (ZN) catalyst and/or a metallocene catalyst.

In certain embodiments, the catalytic active agents are Group 4, Group 5, and/or Group 6 compounds. In other embodiments, the catalytic agents are titanium compounds. In other embodiments, the titanium compounds are halogen containing titanium compounds, e.g., a chlorine containing titanium compound. In other embodiments, the titanium compound is titanium tetrachloride, $TiCl_4$.

In certain embodiments, the catalytic active agents are Group 1, Group 2, and/or Group 3 compounds. In other embodiments, the catalytic active agents are magnesium compounds. In other embodiments, the magnesium compounds are the reaction products of a magnesium dialkyl and an alcohol. In other embodiments, the magnesium dialkyl compound may be any compound in which magnesium is bonded to two alkyl groups. In other embodiments, the alkyl groups are one or more $C_1$-$C_{18}$ alkyl groups. In other embodiments, the magnesium dialkyl compound is butyl-octyl-magnesium. In other embodiments, the alcohol may be linear or branched. In other embodiments, the alcohol is one or more $C_2$ to $C_{16}$ alcohols, ethanol, n-propanol, isopropanol, n-butanol, isobutanol, etc. In other embodiments, the alcohol is a branched alcohol. In other embodiments, the alcohol is 2-ethyl-1-hexanol.

In certain embodiments, the catalytic active agents are Group 13 and/or Group 14 compounds. In other embodiments, the catalytic active agents are aluminum compounds or boron compounds. In other embodiments, the catalytic active agents are aluminum compounds. In other embodiments, the aluminum compounds are aluminum alkyl compounds. In other embodiments, catalytic active agents are chlorine containing aluminum alkyl compounds. In other embodiments, the aluminum compounds are an aluminum alkyl dichloride and/or an aluminum alkyl sesquichloride. In other embodiments, the aluminum compound is ethyl-aluminum-dichloride (EADC).

The ZN catalysts may be supported or unsupported. In certain embodiments, the ZN catalysts are supported. Typical supports comprise inorganic oxides including one or more metal atoms. In certain embodiments, the inorganic oxides are single metal oxides such as silica, alumina, magnesia, titania, silicates, aluminates, titanates, magnesium chloride, and/or mixtures or combination thereof. In other embodiments, the inorganic oxides are mixed metal oxides such as silica/alumina, silica/titania, silica/magnesia, or mixtures and combinations thereof.

In certain embodiments, the ZN catalysts may be supported on an inorganic oxide, which may be prepared by any conventional method known in the art. For example, the catalysts may be prepared by sequentially contacting the inorganic oxide with the compounds of Group 4, Group 5, Group 6, Group 1, Group 2, Group 3, Group 13, and Group 14 of the Periodic Table (IUPAC) as described in EP-A-688794. Alternatively, the catalysts may be prepared by first preparing a solution from the compounds of Group 4, Group 5, Group 6, Group 1, Group 2, Group 3, Group 13, and Group 14 and then contacting the solution with the inorganic oxide as described in WO-A-01/55230. In other embodiments, the supported catalysts may be prepared according to the method described in EP-A-0949274, the entire contents of which are incorporated herein. Catalysts prepared according to this method have high activities in a range of polymerization conditions, e.g., during production of both lower and higher molecular weight components.

In other embodiments, the catalysts may be prepared according to the method described in WO2004/055068 the entire contents of which are incorporated herein. These supports are formed by mixing a solution comprising a magnesium hydrocarbyloxy compound and a solution comprising a halogen containing compound of Group 13 or Group 14. The resulting solid is recovered from the reaction mixture and optionally washed prior to treatment with a catalytically active compound of Group 4, Group 5, or Group 6.

The ZN catalysts for use in the present invention may additionally comprise one or more conventional cocatalysts and/or activators. Typical co-catalysts include aluminum alkyl compounds, e.g. aluminum trialkyl compounds. In certain embodiments, the co-catalyst is triethyl aluminum (TEA).

The electron donor present in the ZN catalysts used herein may be an ether having between 2 and 20 carbon atoms, In certain embodiments, the ether has between 2 to 18 carbon atoms. In other embodiments, the electron donors comprise alkyl ethers. In other embodiments, the electron donors comprise cycloalkyl ethers having 2 to 18 carbon atoms. In other embodiments, the electron donors of the present invention are "internal" electron donors rather than "external" electron donors. The electron donors may be added during synthesis of the catalyst compositions of this disclosure, i.e., adding the electron donors into the catalyst preparation mixture.

In certain embodiments, the electron donors may be alkyl ethers of the general formula $R^1OR^2$, wherein $R^1$ and $R^2$, which may be identical or different, may be $C_1$-$C_8$ alkyl groups or together form a ring comprising 4 to 12 carbon atoms. In other embodiments, $R^1$ and $R^2$ form a ring, comprising 4 to 6 carbon atoms. In other embodiments, the alkyl ethers include diethyl ether, n-dibutylether, s-dibutylether, dioctylethers, tetrahydropyran, 3-methyltetrahydropyran, 2-methylterahydrofuran, tetrahydropyran, or mixtures and combinations. In other embodiments, the electron donor may be tetrahydrofuran.

In other embodiments, the ZN catalysts may have a molar ratio of electron donor to active metal centers (e.g., Ti) between about 0.1 and about 5, a molar ratio between about 0.1 and about 4, a molar ratio between about 0.1 and about 2.5:1, a molar ratio between about 0.5 and about 2.0:1, a molar ratio between about 0.7 and about 1.8:1, a molar ratio between about 1.0 and about 1.6:1, a molar ratio between about 1.2 and about 1.5:1, or a molar ratio of about 1.5:1. In other embodiments, the ZN catalysts comprise Ti compounds having a molar ratio of electron donor to Ti between about 0.1 and about 1.5:1, a molar ratio between about 1.2 and about 1.4:1, or a molar ratio of about 1.5:1. These ZN catalysts are particularly advantageous and provide polymers having a very narrow molecular weight distribution as well as a high molecular weight. In other embodiments, the ZN catalysts comprise an ether electron donor, wherein the molar ratio of electron donor to Ti in the catalyst is 0.1 to 1.6:1.

In other embodiments, the ZN catalysts comprise an electron donor which may be prepared by various different methods. For example, the electron donor may be introduced during the initial synthesis of the catalysts, e.g., at the same time as the compounds of Group 4, Group 5, and/or Group 6 are added. However, the ZN procatalyst may be preformed and then contacted with an electron donor and optionally dried. Contact may be achieved by, for example, mixing the catalysts and the electron donors in appropriate amounts. Usually little, or no, excess of electron donor is required (e.g., a stoichiometric amount of electron donor may be used). The catalyst/electron donor mixture may optionally be heated to a temperature between about 30° C. and about 90° C. with mixing. Subsequent drying may be carried out in accordance with methods conventional in the art.

In certain embodiments, the ZN catalysts comprise a Ti compound and an ether electron donor, wherein the molar ratio of electron donor to Ti is between about 0.1 and about 1.6:1. In other embodiments, the ZN catalysts are prepared by contacting appropriate amounts of the Ti compound and the electron donor with mixing and optionally drying.

In certain embodiments, the ZN catalysts may be employed in multistage polymerization stages, i.e., polymerizing in at least two stages. In other embodiments, the polymerization is carried out in a series of reactors, which are connected in series such that the products of one reactor are used as the starting materials in the next reactor. The polymerization may be carried out continuously or batch wise.

Methods of Polymerizing Using the Catalysts

Embodiments of this disclosure broadly relate to methods of polymerizing one or more ethylenically unsaturated monomers including contacting a polymerization catalyst composition including a catalyst component including one or more active catalytic agents and a co-catalyst component including one or more ionic compounds and one or more ethylenically unsaturated monomers. In certain embodiments, the catalyst component and the co-catalyst component may be one and the same and may be in the form of an ionic compound including one or more active catalytic agents. In other embodiments, the ionic compounds are the co-catalyst component that improves catalytic agent activity, increases a concentration of active catalytic centers, and reduces over reduction of the catalytic agents, thereby maximizing the active agents catalytically active oxidation state centers and minimizing the less active or inactive catalytic agent oxidation state centers. In certain embodiments, the ethylenically unsaturated monomers comprise linear, branched, and/or cyclic olefins. In certain embodiments, the ethylenically unsaturated monomers comprise linear, branched, and/or cyclic α-olefins. In other embodiments, the ethylenically unsaturated monomers comprise linear α-olefins of the general formula $R^a$–$CR^b$=$CR^cR^d$, wherein $R^a$, $R^b$, $R^c$, and $R^d$ may independently be hydrogen atoms, aryl groups, alkyl groups, alkaryl groups, aryalkyl groups, other hydrocarbyl groups, and combinations thereof.

In other embodiments, the catalyst component comprises one or more active catalytic agents supported on a support, wherein the support may be a metal oxide support, a mixed metal oxide support, or other catalyst support material and the co-catalyst component includes (a) one or more ionic compounds or (b) one or more ICs and one or more conventional co-catalysts. In certain embodiments, the co-catalyst component includes one or more ICs and one or more traditional co-catalysts such as aluminum alkyls. In certain embodiments, the one or more ICs and one or more traditional co-catalysts may be pre-mixed in a solution containing anywhere from about 1 wt. % to about 100 wt. % of the one or more ICs. In other embodiments, the co-catalyst component may comprise only one or more ICs, totally replacing conventional co-catalyst such as aluminum alkyls. In other embodiments, the co-catalyst component may be sequentially added to a supported catalyst in multiple addition steps and at different times and concentrations. In certain embodiments, the ICs may be added to the polymerization reactor along with or in place of an aluminum alkyl.

As stated previously, the IC compounds for use in this disclosure may comprise at least one cation and at least one anion, provided however, that the IC is neutral. Each cation and each anion may independently and simultaneously introduce specific characteristics to the polymerization catalyst composition, which are not easily obtainable with traditional dissolution and formulation techniques. Thus, by providing different ions and ion combinations, one or more characteristics or properties of the catalyst compositions may be changed, thereby the polymerization catalyst compositions achieve characteristics or properties not achievable using conventional co-catalysts or additives. Examples of characteristics or properties that may be controlled by different ion selections include, without limitation, melting point temperature, catalyst solubility, polymer solubility, monomer incorporation rates, and rates of dissolution of different components. It is this multi-nature/functionality of the disclosed ionic compound, containing catalyst compositions that allow for fine-tuning, tailoring, or designing specific catalysts using different ionic compounds to attain desired catalytic characteristics and/or properties.

In certain embodiments, the ionic compounds may be used neat, i.e., there are no or substantially no solvents or other materials besides the ionic precursor substrate and/or the ethylenically unsaturated monomer(s) present in the reaction.

In other embodiments, the ionic compounds may include at least one metal halide anion. In other embodiments, the ionic compounds may include two or more halide anions, e.g., 2, 3, 4, 5, 6, 7, 8, 9, 10, or more anions. In other embodiments, the anions used in the ionic compounds of this disclosure may be the same or different. In other embodiments, the anions used in ionic compounds of this disclosure may be different, i.e., the ionic compounds may comprise more than one anion, e.g., 2, 3, 4, 5, 6, 7, 8, 9, 10, or more different kinds of anions.

In other embodiments, the anions used in the ionic compounds may each be independently selected from group consisting of metal halide anions, sometimes referred to as "halometallates". In other embodiments, the ionic compounds include at least two metal halide anions or so called mixed halometallates.

In other embodiments, the at least two metal halide anions may be incorporated into the ionic compounds in any suitable molar ratio so long as the ionic compound is charge balanced. As disclosed herein, the ionic compounds may include at least one cation. In other embodiments, the disclosed ionic compounds may comprise more than one cations (e.g., 2, 3, 4, 5, 6, 7, 8, 9, 10, or more different cations). In other embodiments, the cations used in the disclosed ionic compounds may be the same or different. In other embodiments, the cations used in the disclosed ionic compounds may be different, that is, the ionic compounds may comprise more than one kind of cations (e.g., 2, 3, 4, 5, 6, 7, 8, 9, 10, or more different kinds of cations).

In other embodiments, the cation used in the disclosed ionic compounds may be an organic group-containing cation (also referred to herein as "organic cation"). The organic cation may be a complex polyatomic cation, which contains at least one organic group bonded to a heteroatom. In other embodiments, the ionic compound may include at least one organic cation.

In other embodiments, the organic cations used in the disclosed ionic compounds may include compounds that contain one or more heteroatoms (e.g., nitrogen, phosphorus, oxygen, or sulfur heteroatom(s)). For example, the organic cation can comprise a linear, branched, or cyclic compound comprising one or more heteroatoms or heterocyclic compound.

In other embodiments, the nitrogen atom-containing groups may exist as a neutral compound or may be converted into a positively-charged quaternary ammonium species by alkylation, acylation, arylation, or protonation of the nitrogen atom. Thus, compounds that possess a quaternary nitrogen atom (known as quaternary ammonium compounds (QACs)) represent one class of cations. According to the methods and compositions disclosed herein, any compound that contains a quaternary nitrogen atom or a nitrogen atom that may be converted into a quaternary nitrogen atom (cation precursor) may be a suitable cation for the disclosed ionic compounds.

In other embodiments, phosphorous atoms may exist as a charged phosphonium species, for example, through alkylation, acylation, arylation, or protonation of the phosphorous atom. Thus, compounds that possess a quaternary phosphorous atom (known as quaternary phosphonium compounds) may represent another class of cations. According to the methods and compositions disclosed herein, any compound that contains a quaternary phosphorus atom or a phosphorus atom that may be converted into a quaternary phosphonium atom may be suitable cations for the disclosed ionic compounds.

In other embodiments, sulfur atoms can exist as a charged sulfonium species, for example, through alkylation, acylation, arylation, or protonation of the sulfurous atom. Thus, compounds that possess a ternary sulfurous atom represent another class of cations. According to the methods and compositions disclosed herein, any compound that contains a ternary sulfurous atom or a sulfurous atom that may be converted into a ternary sulfurous atom may be suitable cations for the disclosed ionic compounds.

In other embodiments, the cations may be based on a heteroaryl such as an aliphatic heteroaryl. An aliphatic heteroaryl cation is a compound that comprises at least one aliphatic moiety bonded to a heteroaryl moiety. In aliphatic heteroaryl cations, the aliphatic moiety may be any alkyl, alkenyl, alkynyl, heteroalkyl, heteroalkenyl, heteroalkynyl, cycloalkyl, cycloalkenyl, heterocycloalkyl, or heterocycloalkenyl group, as described herein.

Ammonium Cations

In certain embodiments, the ionic compounds may comprise an ammonium cation of the structure $[NR^1R^2R^3R^4]^+$, wherein the $R^1$, $R^2$, $R^3$, and $R^4$ groups are independently a H atom, a halogen atom, a $C_1$-$C_{20}$ hydrocarbyl group (e.g., substituted or unsubstituted alkyl group, aryl group—alkaryl group or aralkyl group), a $C_1$-$C_8$ substituted or unsubstituted cyclic hydrocarbyl group, or mixtures thereof, wherein the hydrocarbyl group includes sufficient hydrogen atoms to satisfy the valence, wherein one or more of the carbon atoms may be replaced by one or more hetero atoms selected from the group consisting of boron, nitrogen, oxygen, phosphorus, sulfur and mixtures or combinations thereof, and wherein one or more of the hydrogen atoms may be replaced by one or more single valence atoms selected from the group consisting of fluorine, chlorine, bromine, iodine and mixtures or combinations thereof. In other embodiments, two or more $R^1$, $R^2$, $R^3$, and $R^4$ groups may form a 3-10 membered cyclic moiety or ring. In other embodiments, the cation may comprise an aniline cation.

In other embodiments, the $R^1$, $R^2$, $R^3$, and $R^4$ groups are independently H or $C_1$-$C_8$ substituted or unsubstituted alkyl groups. In some examples, the $R^1$, $R^2$, $R^3$, and $R^4$ groups are independently H or $C_1$-$C_8$ unsubstituted alkyl groups. In other embodiments, the $R^1$, $R^2$, $R^3$, and $R^4$ groups are independently H or $C_1$-$C_4$ unsubstituted alkyl groups. In other embodiments, $R^1$ is H. In other embodiments, $R^2$, $R^3$, and $R^4$ are $C_2H_5$. In other embodiments, the at least one ammonium cation comprises $[HN(C_2H_5)_3]^+$. In other embodiments, the ionic compound comprises $[HN_{222}]^+[Al_2Cl_7]^-$, where the notation "$HN_{222}$" represents the triethylammonium ion $[HN(C_2H_5)_3]^+$.

Phosphonium Cations

In certain embodiments, the ionic compound may comprise a phosphonium cation of the structure $[PR^1R^2R^3R^4]^+$, wherein the $R^1$, $R^2$, $R^3$, and $R^4$ groups are independently a H atom, a halogen atom, a $C_1$-$C_{20}$ hydrocarbyl group (e.g., substituted or unsubstituted alkyl group, aryl group—alkaryl group or aralkyl group), a $C_1$-$C_8$ substituted or unsubstituted cyclic hydrocarbyl group, or mixtures thereof, wherein the hydrocarbyl group include sufficient hydrogen atoms to satisfy the valence, wherein one or more of the carbon atoms may be replaced by one or more hetero atoms selected from the group consisting of boron, nitrogen, oxygen, phosphorus, sulfur and mixtures or combinations thereof, and wherein one or more of the hydrogen atoms may be replaced by one or more single valence atoms selected from the group consisting of fluorine, chlorine, bromine, iodine and mixtures or combinations thereof. In other embodiments, two or more $R^1$, $R^2$, $R^3$, and $R^4$ groups may form a 3-10 membered cyclic moiety or ring.

In other embodiments, the $R^1$, $R^2$, $R^3$, and $R^4$ groups are independently H or $C_1$-$C_{14}$ unsubstituted alkyl groups. In other embodiments, the $R^1$, $R^2$, $R^3$, and $R^4$ groups are independently $C_1$-$C_{14}$ unsubstituted alkyl groups. In other embodiments, the at least one phosphonium cation comprises $[(CH_2)_{13}CH_3P((CH_2)_5CH_3)_3]^+$. In other embodiments, the ionic compound may comprise $[P_{66614}]^+$ $[Al_2Cl_7]^-$, where the notation "$P_{66614}$" represents the trihexyltetradecylphosphonium ion, $[(CH_3(CH_2)_5)_3CH_3(CH_2)_{13}P]^+$.

Sulfonium Cations

In certain embodiments, the ionic compound may comprise a sulfonium cation of the structure $[SR^1R^2R^3]^+$, wherein the $R^1$, $R^2$, and $R^3$ groups are independently a H atom, a halogen atom, a $C_1$-$C_{20}$ hydrocarbyl group (e.g., substituted or unsubstituted alkyl group, aryl group—alkaryl group or aralkyl group), a $C_1$-$C_8$ substituted or unsubstituted cyclic hydrocarbyl group, or mixtures thereof, wherein the hydrocarbyl group include sufficient hydrogen atoms to satisfy the valence, wherein one or more of the carbon atoms may be replaced by one or more hetero atoms selected from the group consisting of boron, nitrogen, oxygen, phosphorus, sulfur and mixtures or combinations thereof, and wherein one or more of the hydrogen atoms may be replaced by one or more single valence atoms selected from the group consisting of fluorine, chlorine, bromine, iodine and mixtures or combinations thereof. In other embodiments, two or more $R^1$, $R^2$, $R^3$, and $R^4$ groups may form a 3-10 membered cyclic moiety or ring.

In other embodiments, $R^1$, $R^2$, and $R^3$ are independently a H atom or a $C_1$-$C_{20}$ substituted or unsubstituted alkyl groups. In other embodiments, the $R^1$, $R^2$, and $R^3$ groups are independently a H atom or $C_1$-$C_{14}$ unsubstituted alkyl groups. In other embodiments, the $R^1$, $R^2$, and $R^3$ groups are independently a $C_1$-$C_{14}$ unsubstituted alkyl groups. In other embodiments, the at least one sulfonium cation comprises $[S(CH_3)_3]^+$. In other embodiments, the ionic compound may comprise $[S(C_6H_5)_3]^+[SO_3CF_3]^-$ or $[S(CH_3)_3]^+[I]^-$ or $[S(CH_3)_3]^+[Al_2Cl_7]^-$.

Catalytically Active Agents

Heterogeneous Catalysts

In certain embodiments, the catalysts may comprise a class of titanium-based catalysts (and some vanadium-based catalysts) for ethylenically unsaturated monomer polymerization which may be roughly subdivided into two subclasses, (a) catalysts suitable for homopolymerization of ethylene and for ethylene/1-alkene copolymerization reactions leading to copolymers with a low 1-alkene content, 2-4 mol % (LLDPE resins), and (b) catalysts suitable for the synthesis of isotactic 1-alkenes. The overlap between these two subclasses is relatively small because the requirements to the respective catalysts differ widely.

In other embodiments, the catalysts are supported, i.e., bound to a solid with a high surface area. Both $TiCl_4$ and $TiCl_3$ give active catalysts. In other embodiments, the support is $MgCl_2$. In other embodiments, the catalysts include a carrier, a material that determines the size and the shape of catalyst particles. In other embodiments, the carrier is microporous spheres of amorphous silica with a diameter of 30-40 mm. During the catalyst synthesis, both the titanium compounds and $MgCl_2$ are packed into the silica pores.

All modern supported Ziegler-Natta catalysts designed for polymerization of propylene and higher 1-alkenes are prepared with $TiCl_4$ as the active ingredient and $MgCl_2$ as a support. Another component of all such catalysts is an organic modifier, usually an ester of an aromatic diacid or a diether. The modifiers react both with inorganic ingredients of the solid catalysts as well as with organoaluminum cocatalysts. These catalysts polymerize propylene and other 1-alkenes to highly crystalline isotactic polymers.

Metallocene Catalysts

These catalysts are metallocenes together with a cocatalyst, typically MAO, —[O—Al(CH$_3$)]$_n$-. The idealized metallocene catalysts have the composition Cp$_2$MCl$_2$(M=Ti, Zr, Hf) such as titanocene dichloride. Typically, the organic ligands are derivatives of cyclopentadienyl. In some complexes, the two cyclopentadiene (Cp) rings are linked with bridges, like —CH$_2$—CH$_2$—or >SiPh$_2$. Depending of the type of their cyclopentadienyl ligands, for example by using an ansa-bridge, metallocene catalysts can produce either isotactic or syndiotactic polymers ofpropylene and other 1-alkenes.

Non-Metallocene Catalysts

Ziegler-Natta catalysts of the third class, non-metallocene catalysts, use a variety of complexes of various metals, ranging from scandium to lanthanoid and actinoid metals, and a large variety of ligands containing oxygen, nitrogen, phosphorus, and sulfur. The complexes are activated using MAO, as is done for metallocene catalysts.

Most Ziegler-Natta catalysts and all the alkylaluminium cocatalysts are unstable in air, and the alkylaluminium compounds are pyrophoric. The catalysts, therefore, are always prepared and handled under an inert atmosphere.

SUITABLE COMPONENTS FOR USE IN THE DISCLOSURE

Suitable anions for use in the ionic compounds of this disclosure include, without limitation, AlEt$_3$Cl$^-$, Al$_2$Et$_6$Cl$^-$, Al$_3$Et$_9$Cl$^-$, OR$^-$, F$^-$, Cl$^-$, Br$^-$, I$^-$, HSO$_4^-$, RSO$_4^-$, H$_2$PO$_4^-$, HRPO$_4^-$, R$_2$PO$_4^-$, HSO$_3^-$, RSO$_3^-$, H$_2$PO$_3^-$, HRPO$_3^-$, R$_2$PO$_3^-$, HRPO$_2^-$, R$_2$PO$_2^-$, HRPS$_2^-$, R$_2$PS$_2^-$, NO$_3^-$, HCO$_3^-$, RCO$_3^-$, HCOO$^-$, RCOO$^-$, SCN$^-$, SO$_3$NH$_2^-$, HF$_2^-$, (CF$_3$SO$_2$)$_2$N$^-$. (CF$_3$CF$_2$SO$_2$)$_2$N$^-$, PF$_6^-$, BF$_4^-$, or mixtures or combinations thereof, where R a hydrocarbyl group having between about between about 1 and 40 carbon atoms and the required hydrogen atoms to satisfy the valence and wherein one or more of the carbon atoms may be replaced by one or more hetero atoms selected from the group consisting of boron, nitrogen, oxygen, phosphorus, sulfur and mixtures or combinations thereof and wherein one or more of the hydrogen atoms may be replaced by one or more single valence atoms selected from the group consisting of fluorine, chlorine, bromine, iodine, and mixtures or combinations thereof. Exemplary examples of certain anions include, without limitation, AlEt$_3$Cl$^-$, Al$_2$Et$_6$Cl$^-$, Al$_3$Et$_9$Cl$^-$, CF$_3$SO$_3^-$, CF$_3$COO$^-$, CH$_3$SO$_3^-$, or mixture of is selected from the group consisting of OR$^-$, F$^-$, Cl$^-$, Br$^-$, I$^-$, HSO$_4^-$, RSO$_4^-$, H$_2$PO$_4^-$, HSO$_3^-$, RSO$_3^-$, H$_2$PO$_3^-$, CO$_3^{2-}$, HCO$_3^-$, HCOO$^-$, RCOO$^-$, [(CF$_3$)$_2$SO$_2$]$_2$N$^-$, NO$_3^-$, PF$_6^-$, BF$_4^-$, SCN$^-$, SO$_3$NH$_2^-$, HF$_2^-$, (CF$_3$SO$_2$)$_2$N$^-$, (CF$_3$CF$_2$SO$_2$)$_2$N$^-$, and mixtures or combinations thereof.

Suitable heteroaryl cations include, without limitation, a cation including a heteroaryl moiety, wherein a heteroaryl moiety may be an aryl group that includes at least one (one or more) hetero atoms including a nitrogen atom, an oxygen atom, a sulfur atom, a phosphorus atom, or mixtures and combinations thereof. The heteroaryl cation may include a halonium moiety. Examples of specific heteroaryl moieties that may be used in the heteroaryl cations include, without limitation, substituted or unsubstituted benztriazoliums, substituted or unsubstituted benzimidazoliums, substituted or unsubstituted benzothiazoliums, substituted or unsubstituted pyridiniums, substituted or unsubstituted pyridaziniums, substituted or unsubstituted pyrimidiniums, substituted or unsubstituted pyraziniums, substituted or unsubstituted imidazoliums, substituted or unsubstituted pyrazoliums, substituted or unsubstituted oxazoliums, substituted or unsubstituted 1,2,3-triazoliums, substituted or unsubstituted 1,2,4-triazoliums, substituted or unsubstituted thiazoliums, substituted or unsubstituted piperidiniums, substituted or unsubstituted pyrrolidiniums, substituted or unsubstituted quinoliums, substituted or unsubstituted isoquinoliums, or mixtures and combinations thereof. As described herein, when the heteroatom of the heteroaryl is nitrogen, phosphorus, or sulfur, then the heteroaryl cations are quaternary cations such as ammonium quaternary cations, phosphonium quaternary cations, and sulfonium quaternary cations.

Suitable organic cations for use herein include, without limitation, an organic cation comprising one or more heteroatoms. For example, the organic cation can comprise an ammonium alkyl, a pyridinyl moiety, imidazolinyl moiety, or the like that may have substituted or unsubstituted linear or branched alkyl units attached thereto. In other embodiments, the organic cation can comprise a single heteroatom wherein a sufficient number of substituted or unsubstituted linear or branched alkyl units are attached to the heteroatom such that a cation is formed. For example, the organic cation may comprise C$_n$ alkylmethylimidazolium (C$_n$mim), where n is an integer of from 1 to 8. Preferably, the cation C$_1$-C$_4$ alkyl-methylimidazolium (C$_1$-C$_4$mim) can be used. Other non-limiting examples of heterocyclic and heteroaryl units that may be alkylated to form cationic units include substituted or unsubstituted furans, substituted or unsubstituted benzofurans, substituted or unsubstituted dibenzofurans, substituted or unsubstituted indolizines, substituted or unsubstituted isoindoles, substituted or unsubstituted indoles, substituted or unsubstituted indolines, substituted or unsubstituted indazoles, substituted or unsubstituted imidazoles, substituted or unsubstituted morpholiniums, substituted or unsubstituted morpholines, substituted or unsubstituted oxazoles, substituted or unsubstituted oxaphospholes, substituted or unsubstituted oxothiazoles, substituted or unsubstituted oxazines, substituted or unsubstituted oxazolines, substituted or unsubstituted phenazine, substituted or unsubstituted phthalazines, substituted or unsubstituted purines, substituted or unsubstituted pyrroles, substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted phospholes, substituted or unsubstituted pentazoles, substituted or unsubstituted pyridazines, substituted or unsubstituted piperazines, substituted or unsubstituted piperidines, substituted or unsubstituted pyrans, substituted or unsubstituted isoquinolines, substituted or unsubstituted quinolines, substituted or unsubstituted quinoxalines, substituted or unsubstituted quinazolines, substituted or unsubstituted selenozoles, substituted or unsubstituted triazoles, substituted or unsubstituted thiazoles, substituted or unsubstituted isothiazoles, substituted or unsubstituted dithiazoles, substituted or unsubstituted azathiazoles, substituted or unsubstituted thiophenes, substituted or unsubstituted benzothiophenes, substituted or unsubstituted dibenzothiophenes, substituted or unsubstituted tetrazoles, substituted or unsubstituted thiadiazoles, derivatives thereof, and mixtures or combinations thereof.

Suitable primary metal for use in the metal halide anions of this disclosure include, without limitation, a metal selected from Group 2 metals (beryllium (Be), magnesium (Mg), calcium (Ca), strontium (Sr), and barium (Ba)), Group 3 metals (boron (B), aluminum (Al), gallium (Ga), indium (In), and thallium (Tl)), transition metals (scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), tantalum (Ta), tungsten (W), rhenium (Re), Osmium (Os), iridium (Ir), platinum (Pt), gold (Au), mercury (Hg), actinium (Ac), thorium (Th), protactinium (Pa), and uranium (U)), tin (Sn), lead (Pb), and mixtures or combinations thereof. Exemplary examples include, without limitation, Al, Fe, Cr, Zn, Cu, Sn, Pb, Ti, Pd, Zr, Ga, and mixtures or combinations thereof. Other exemplary examples include, without limitation, at least one metal halide anion comprises an aluminum halide.

Suitable metal halide anions include F, Cl, Br, I, and mixtures or combinations thereof. Exemplary examples include, without limitation, at least one metal halide anion comprises a metal chloride.

Suitable ionic compounds disclosed herein include, without limitation, chloroaluminates, chlorozincates, chloroferrates, chlorogallates, chlorostannates, chloroindates, chlorochromates, chlorocuprates, chlorotitannates, chlorozirconates, chloropalladates, and mixtures thereof as well as alkyl substituted derivatives of these compounds. Exemplary examples of chloroaluminates include, without limitation, $[Al_2Cl_7]^-$. Exemplary examples of substituted derivative compounds include $AlEt_3Cl^-$, $Al_2Et_6Cl^-$, or $Al_3Et_9Cl^-$.

Suitable ethylenically unsaturated monomers for use with the catalyst compositions disclosed herein include, without limitation, linear, branched or ring containing α-olefins. In other embodiments, the ethylenically unsaturated monomers comprise linear α-olefins of the general formula $R^a$–$CR^b$=$CR^cR^d$, wherein $R^a$, $R^b$, $R^c$, and $R^d$ may independently be hydrogen atoms, aryl groups, alkyl groups, alkaryl groups, aryalkyl groups, other hydrocarbyl groups, and mixtures or combinations thereof.

EXPERIMENTS OF THE DISCLOSURE

All experiments were run under an inert atmosphere.

Example 1

This example illustrates a general catalyst preparation methodology.

Hexane and 1-hexene were purified to remove trace amounts of water, oxygen and other contaminants using between 3 and 5 freeze-thaw cycles. 4 mL of hexane were added to a vial at ambient temperature between about 25° C. and about 27° C. 50 mg of co-catalyst (either an IC or $Al(CH_2CH_3)_3$ or TEAL) were added to the vial and agitated by means of magnetic stirring. 2 mL of 1-hexene were added to the vial and agitated. 45 mg of a commercially available supported Ziegler-Natta catalyst, $TiCl_4$ on a $MgCl_2$ support, were added to the vial and agitated. The catalyst was then used to polymerize an ethylenically unsaturated monomer and the maximum temperature rise was recorded as an indication of activity and the produced polymer was viewed as an indicator of catalyst activity.

Comparative Example 1

This example illustrates the above general catalyst preparation using TEAL as the co-catalyst.

Hexane and 1-hexene were purified to remove trace amounts of water, oxygen and other contaminants using between 3 and 5 freeze-thaw cycles. 4 mL of hexane were added to a vial at ambient temperature between about 25° C. and about 27° C. 50 mg of TEAL were added to the vial and agitated by means of magnetic stirring. 2 mL of 1-hexene were added to the vial and agitated. 45 mg of a commercially available supported Ziegler-Natta catalyst, $TiCl_4$ on a $MgCl_2$ support, were added to the vial and agitated. The maximum temperature rise was 40° C.

Example 2

This example illustrates the above general catalyst preparation using $[NEt_4]^+[Al_3Et_9Cl]^-$ as the co-catalyst.

Hexane and 1-hexene were purified to remove trace amounts of water, oxygen and other contaminants using between 3 and 5 freeze-thaw cycles. 4 mL of hexane were added to a vial at ambient temperature between about 25° C. and about 27° C. 50 mg of $[NEt_4]^+[Al_3Et_9Cl]^-$ were added to the vial and agitated by means of magnetic stirring. 2 mL of 1-hexene were added to the vial and agitated. 45 mg of a commercially available supported Ziegler-Natta catalyst, $TiCl_4$ on a $MgCl_2$ support, were added to the vial and agitated. The maximum temperature rise was 46° C.

Example '

This example illustrates the above general catalyst preparation using $[NEt_4]^+[Al_4Et_{12}Cl]^-$ as the co-catalyst.

Hexane and 1-hexene were purified to remove trace amounts of water, oxygen and other contaminants using between 3 and 5 freeze-thaw cycles. 4 mL of hexane were added to a vial at ambient temperature between about 25° C. and about 27° C. 50 mg of $[NEt_4]^+[Al_4Et_{12}Cl]^-$ were added to the vial and agitated by means of magnetic stirring. 2 mL of 1-hexene were added to the vial and agitated. 45 mg of a commercially available supported Ziegler-Natta catalyst, $TiCl_4$ on a $MgCl_2$ support, were added to the vial and agitated. The maximum temperature rise was 46° C.

Example 4

This example illustrates the above general catalyst preparation using $[NEt_4]^+[Al_{10}Et_{30}Cl]^-$ as the co-catalyst.

Hexane and 1-hexene were purified to remove trace amounts of water, oxygen and other contaminants using between 3 and 5 freeze-thaw cycles. 4 mL of hexane were added to a vial at ambient temperature between about 25° C. and about 27° C. 50 mg of $[NEt_4]^+[Al_{10}Et_{30}Cl]^-$ were added to the vial and agitated by means of magnetic stirring. 2 mL of 1-hexene were added to the vial and agitated. 45 mg of a commercially available supported Ziegler-Natta catalyst, $TiCl_4$ on a $MgCl_2$ support, were added to the vial and agitated. The maximum temperature rise was 46° C.

Examples 2-4 using the ICs as co-catalyst, produced the same amount of polymer but with significantly different character than produced by Comparative Example 1 using TEAL as co-catalyst. Equal amounts of polymer were formed in Examples 1-4. The polymer formed in Example 1 using TEAL as the cocatalyst was a viscous liquid that would flow when the vial was tipped. The polymer formed in Examples 2-4 was solid and would not deform or flow indicating a higher molecular weight polymer was produced. The higher temperature rise in Examples 2-4 indicates higher activity using the ionic compound compared to Example 1 using TEAL.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A composition comprising:
a polymerization catalyst composition including:
a metal-containing composition having:
one or more metal-containing compounds, and
a co-catalyst composition having:
one or more ionic compounds of the general formula (III):

$$[H_pER_q]^{+m}[M_rX_sR_t]^{-n} \qquad \text{III}$$

selected from the group consisting of $[HNEt_3]^+[AlCl_4]^-$, $[HNEt_3]^+[Al_2Cl_7]^-$, $[HNEt_3]^+[AlEt_3Cl]^-$, $[HNEt_3]^+[Al_2Et_6Cl]^-$, $[HNEt_3]^+[Al_2Et_3Cl_4]^-$, $[HNEt_3]^+[Al_3Et_3Cl_7]^-$, $[HNEt_3]^+[GaCl_4]^-$, $[HNEt_3Cl]^+[AlCl_3+GaCl_3]^-$, $[HNEt_3]^+[0.67AlCl_3+0.33ZnCl_4]^-$, $[NEt_4]^+[AlCl_4]^-$, $[NEt_4]^+[Al_2Cl_7]^-$, $[NEt_4]^+[AlEt_3Cl]^-$, $[NEt_4]^+[Al_2Et_6Cl]^-$, $[NEt_4]^+[Al_2Et_3Cl_4]^-$, $[NEt4]^+[Al_3Et_3Cl_7]^-$, $[NEt_4]^+[Al_3Et_9Cl]^-$, $[NEt_4]^+[Al_4Et_{12}Cl]^-$, $[NEt_4]^+[Al_{10}Et_{30}Cl]^-$, $[HPEt_3]^+[AlCl_4]^-$, $[HPEt_3]^+[Al_2Cl_7]^-$, $[HPEt_3]^+[AlEt_3Cl]^-$, $[HPEt_3]^+[Al_2Et_6Cl]^-$, $[HPEt_3]^+[Al_2Et_3Cl_4]^-$, $[HPEt_3]^+[Al_3Et_3Cl_7]^-$, $[HPEt_3]^+[GaCl_4]^-$, $[HPEt_3Cl]^+[AlCl_3+GaCl_3]^-$, $[HPEt_3]^+[0.67AlCl_3+0.33ZnCl_4]^-$, $[PEt_4]^+[AlCl_4]^-$, $[PEt_4]^+[Al_2Cl_7]^-$, $[PEt_4]^+[AlEt_3Cl]^-$, $[NEt_4]^+[Al_2Et_6Cl]^-$, $[PEt_4]^+[Al_2Et_3Cl_4]^-$, $[PEt4]^+[Al_3Et_3Cl_7]^-$, $[PEt_4]^+[Al_3Et_9Cl]^-$, $[PEt_4]^+[Al_4Et_{12}Cl]^-$, $[PEt_4]^+[Al_{10}Et_{30}Cl]^-$, and mixtures or combinations thereof, and Et is ($C_2H_5$),
wherein the metal-containing composition may be supported or unsupported, and
wherein the co-catalyst composition is unsupported.

2. The composition of claim 1, wherein the one or more metal-containing compounds comprise one or more Group 4 compounds, Group 5 compounds, Group 6 compounds, Group 1 compounds, Group 2 compounds, Group 3 compounds, Group 13 compounds, Group 14 compounds, or mixtures and combinations thereof.

3. The composition of claim 2, wherein:
the Group 4 compounds include titanium (Ti), zirconium (Zr), hafnium (Hf), or mixtures and combinations thereof;
the Group 5 compounds include vanadium (V), niobium (Nb), tantalum (Ta), or mixtures and combinations thereof;
the Group 6 compounds include chromium (Cr), molybdenum (Mo), tungsten (W), or mixtures and combinations thereof;
the Group 1 compounds include lithium (Li), sodium (Na), potassium (K), rubidium (Rb), cesium (Cs), francium (Fr), or mixtures and combinations thereof;
the Group 2 compounds include beryllium (Be), magnesium (Mg), calcium (Ca), strontium (Sr), barium (Ba), or mixtures and combinations thereof;
the Group 3 compounds include scandium (Sc), yttrium (Y), or mixtures and combinations thereof;
the Group 13 compounds include boron (B), aluminum (Al), gallium (Ga), indium (In), thallium (Tl), or mixtures and combinations thereof; and
the Group 14 compounds include silicon (Si), germanium (Ge), tin (Sn), lead (Pb), or mixtures and combinations thereof.

4. The composition of claim 2, wherein the metal-containing compounds comprise one or more Group 4 compounds.

5. The composition of claim 4, wherein the Group 4 compounds comprise one or more titanium compounds.

6. A method of making a polymer comprising:
contacting:
one or more ethylenically unsaturated monomers and
a polymerization catalyst composition including:
a metal-containing composition having:
one or more metal-containing compounds, and
an ionic compound composition having:
one or more ionic compounds of the general formula (II):

$$[H_pER_q]^{+m}[M_rX_sR_t]^{-n} \qquad \text{III}$$

selected from the group consisting of $[HNEt_3]^+[AlCl_4]^-$, $[HNEt_3]^+[Al_2Cl_7]^-$, $[HNEt_3]^+[AlEt_3Cl]^-$, $[HNEt_3]^+[Al_2Et_6Cl]^-$, $[HNEt_3]^+[Al_2Et_3Cl_4]^-$, $[HNEt_3]^+[Al_3Et_3Cl_7]^-$, $[HNEt_3]^+[GaCl_4]^-$, $[HNEt_3Cl]^+[AlCl_3+GaCl_3]^-$, $[HNEt_3]^+[0.67AlCl_3+0.33ZnCl_4]^-$, $[NEt_4]^+[AlCl_4]^-$, $[NEt_4]^+[Al_2Cl_7]^-$, $[NEt_4]^+[AlEt_3Cl]^-$, $[NEt_4]^+[Al_2Et_6Cl]^-$, $[NEt_4]^+[Al_2Et_3Cl_4]^-$, $[NEt4]^+[Al_3Et_3Cl_7]^-$, $[NEt_4]^+[Al_3Et_9Cl]^-$, $[NEt_4]^+[Al_4Et_{12}Cl]^-$, $[NEt_4]^+[Al_{10}Et_{30}Cl]^-$, $[HPEt_3]^+[AlCl_4]^-$, $[HPEt_3]^+[Al_2Cl_7]^-$, $[HPEt_3]^+[AlEt_3Cl]^-$, $[HPEt_3]^+[Al_2Et_6Cl]^-$, $[HPEt_3]^+[Al_2Et_3Cl_4]^-$, $[HPEt_3]^+[Al_3Et_3Cl_7]^-$, $[HPEt_3]^+[GaCl_4]^-$, $[HPEt_3Cl]^+[AlCl_3+GaCl_3]^-$, $[HPEt_3]^+[0.67AlCl_3+0.33ZnCl_4]^-$, $[PEt_4]^+[AlCl_4]^-$, $[PEt_4]^+[Al_2Cl_7]^-$, $[PEt_4]^+[AlEt_3Cl]^-$, $[NEt_4]^+[Al_2Et_6Cl]^-$, $[PEt_4]^+[Al_2Et_3Cl_4]^-$, $[PEt4]^+[Al_3Et_3Cl_7]^-$, $[PEt_4]^+[Al_3Et_9Cl]^-$, $[PEt_4]^+[Al_4Et_{12}Cl]^-$, $[PEt_4]^+[Al_{10}Et_{30}Cl]^-$, and mixtures or combinations thereof, and Et is ($C_2H_5$),
wherein the metal-containing composition may be supported or unsupported, and
wherein the co-catalyst composition is unsupported.

7. The method of claim 6, wherein, in the contacting step, the polymerization catalyst composition further includes an aluminum alkyl compound.

8. The method of claim 7, wherein, in the contacting step: the aluminum alkyl compound is selected from the group consisting of triethylaluminum, diethylaluminumchloride, tributylaluminumchloride, methylalumoxane, and mixtures or combinations thereof.

9. The method of claim 6, further comprising:
prior to the polymerization contacting step, mixing the metal-containing composition and the ionic liquid composition.

10. A composition comprising:
a polymerization catalyst composition including:
  a metal-containing composition having:
    one or more supported or unsupported metal-containing compounds, and
  a co-catalyst composition having:
    one or more ionic unsupported compounds comprising one or more compounds of the general formula (III):

$[H_pER_q]^{+m}[M_rX_sR_t]^{-n}$   III selected from the group consisting of $[HNEt_3]^+[AlCl_4]^-$, $[HNEt_3]^+[Al_2Cl_7]^-$, $[HNEt_3]^+[AlEt_3Cl]^-$, $[HNEt_3]^+[Al_2Et_6Cl]^-$, $[HNEt_3]^+[Al_2Et_3Cl_4]^-$, $[HNEt_3]^+[Al_3Et_3Cl_7]^-$, $[HNEt_3]^+[GaCl_4]^-$, $[HNEt_3Cl]^+[AlCl_3+GaCl_3]^-$, $[HNEt_3]^+[0.67AlCl_3+0.33ZnCl_4]^-$, $[NEt_4]^+[AlCl_4]^-$, $[NEt_4]^+[Al_2Cl_7]^-$, $[NEt_4]^+[AlEt_3Cl]^-$, $[NEt_4]^+[Al_2Et_6Cl]^-$, $[NEt_4]^+[Al_2Et_3Cl_4]^-$, $[NEt4]^+[Al_3Et_3Cl_7]^-$, $[NEt_4]^+[Al_3Et_9Cl]^-$, $[NEt_4]^+[Al_4Et_{12}Cl]^-$, $[NEt_4]^+[Al_{10}Et_{30}Cl]^-$, $[HPEt_3]^+[AlCl_4]^-$, $[HPEt_3]^+[Al_2Cl_7]^-$, $[HPEt_3]^+[AlEt_3Cl]^-$, $[HPEt_3]^+[Al_2Et_6Cl]^-$, $[HPEt_3]^+[Al_2Et_3Cl_4]^-$, $[HPEt_3]^+[Al_3Et_3Cl_7]^-$, $[HPEt_3]^+[GaCl_4]^-$, $[HPEt_3Cl]^+[AlCl_3+GaCl_3]^-$, $[HPEt_3]^+[0.67AlCl_3+0.33ZnCl_4]^-$, $[PEt_4]^+[AlCl_4]^-$, $[PEt_4]^+[Al_2Cl_7]^-$, $[PEt_4]^+[AlEt_3Cl]^-$, $[NEt_4]^+[Al_2Et_6Cl]^-$, $[PEt_4]^+[Al_2Et_3Cl_4]^-$, $[PEt4]^+[Al_3Et_3Cl_7]^-$, $[PEt_4]^+[Al_3Et_9Cl]^-$, $[PEt_4]^+[Al_4Et_{12}Cl]^-$, $[PEt_4]^+[Al_{10}Et_{30}Cl]^-$, and mixtures or combinations thereof, and
Et is $(C_2H_5)$.

* * * * *